United States Patent
Robinson et al.

(10) Patent No.: US 9,455,973 B1
(45) Date of Patent: Sep. 27, 2016

(54) SECURE STORAGE AND RETRIEVAL OF DATA IN A DATABASE WITH MULTIPLE DATA CLASSES AND MULTIPLE DATA IDENTIFIERS

(71) Applicant: EMC Corporation, Hopkinton, MA (US)

(72) Inventors: Peter Robinson, Enoggera Reservoir (AU); Nikolaos Triandopoulos, Arlington, MA (US); David Alistair Healy, New Farm (AU)

(73) Assignee: EMC Corporation, Hopkinton, MA (US)

( * ) Notice: Subject to any disclaimer, the term of this patent is extended or adjusted under 35 U.S.C. 154(b) by 326 days.

(21) Appl. No.: 14/139,978

(22) Filed: Dec. 24, 2013

(51) Int. Cl.
*G06F 7/04* (2006.01)
*H04L 29/06* (2006.01)

(52) U.S. Cl.
CPC .................... *H04L 63/08* (2013.01)

(58) Field of Classification Search
CPC ............................. G06F 21/31; H04L 63/08
USPC ............................................. 726/7
See application file for complete search history.

(56) References Cited

U.S. PATENT DOCUMENTS

2006/0143453 A1\* 6/2006 Imamoto ........... H04L 9/3273 713/169
2015/0047016 A1\* 2/2015 Wilhelm ............. G06F 3/017 726/18

\* cited by examiner

*Primary Examiner* — Anthony Brown
(74) *Attorney, Agent, or Firm* — Ryan, Mason & Lewis, LLP

(57) ABSTRACT

Secure storage and retrieval of data is provided with multiple data classes and data identifiers. Data values of a client are stored by receiving one or more authentication sets, at least one data value, an associated data class of the data value and a pseudo-random client value; calculating a data seed value based on the pseudo-random client value, a pseudo-random server value and the associated data class of the data value; generating a random data index value; generating a database index value based on the data seed value and the random data index value; storing the database index value; and providing the random data index value to the client. The client can be authenticated at the time of storage based on the one or more authentication sets. The authentication of the client and the storage of the data can be atomic such that only authenticated clients store the one or more data values. Techniques are also provided for the retrieval of stored data.

23 Claims, 6 Drawing Sheets

300

102 — CLIENT — CLIENT GENERATES ClientRandom — 310
AND STORES IT LOCALLY.

104 — SERVER — SERVER GENERATES ServerRandom — 320
AND STORES IT LOCALLY.

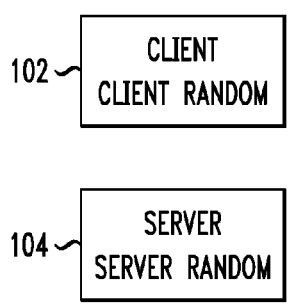

610 — CLIENT HAS ONE OR MORE AUTHENTICATION SETS THAT CLIENT WANTS TO USE TO AUTHENTICATE WITH, AND A DATA VALUE BELONGING TO A CERTAIN DATA CLASS THAT THE CLIENT WISHES TO SET.

620 — CLIENT SENDS THE SERVER: CLIENT RANDOM, AUTHENTICATION SET(S) AND THE VALUE TO BE SET.

FIG. 6B
600

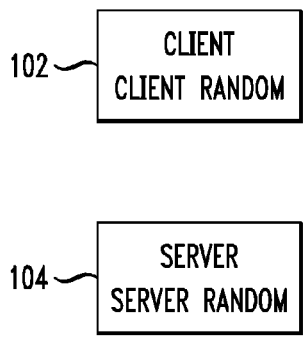

630 — SERVER AUTHENTICATES THE USER:

630a — SERVER CALCULATES:
authSeed3 = ONE WAY FUNCTION (CLIENT RANDOM, SERVER RANDOM, DATA CLASS = "AUTHENTICATION")

630b — FOR EACH AUTHENTICATION SET:

630b1 — SERVER CALCULATES:
dbIndex3 = Derivation function (authSeed3, authIndex)

630b2 — SERVER CHECKS DATABASE TO SEE IF THERE IS AN ENTRY FOR dbIndex3. AUTHENTICATION FAILS IF THERE IS NO SUCH VALUE.

630b3 — SERVER FETCHES VALUE ASSOCIATED WITH dbIndex3 AND COMPARES WITH AUTH VALUE. AUTH FAILS IF THEY ARE NOT THE SAME.

630c — AUTHENTICATION PASSES IF ALL AUTHENTICATION SETS PASS.

FIG. 6C
600

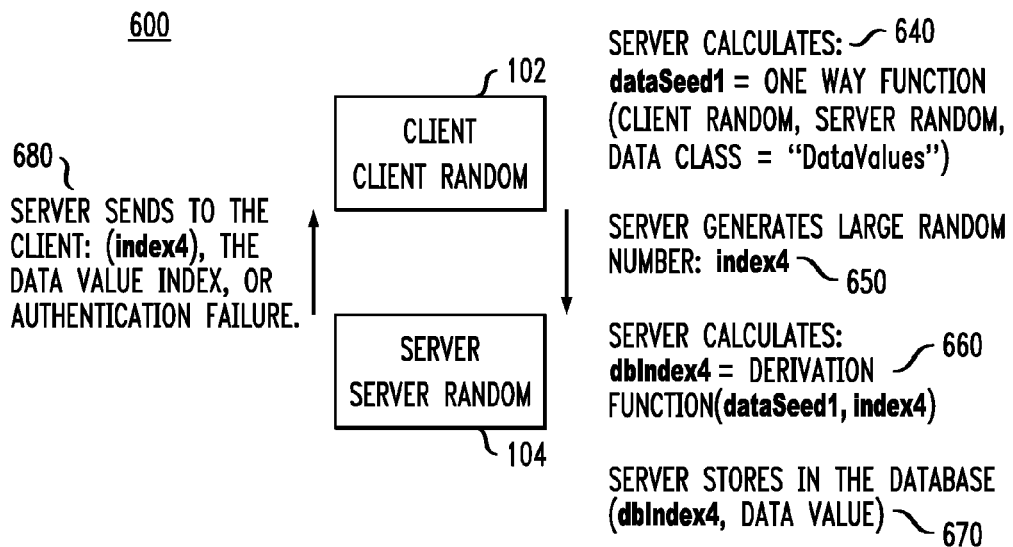

680 — SERVER SENDS TO THE CLIENT: (index4), THE DATA VALUE INDEX, OR AUTHENTICATION FAILURE.

SERVER CALCULATES: — 640
dataSeed1 = ONE WAY FUNCTION (CLIENT RANDOM, SERVER RANDOM, DATA CLASS = "DataValues")

SERVER GENERATES LARGE RANDOM NUMBER: index4 — 650

SERVER CALCULATES: — 660
dbIndex4 = DERIVATION FUNCTION(dataSeed1, index4)

SERVER STORES IN THE DATABASE (dbIndex4, DATA VALUE) — 670

FIG. 7A
700

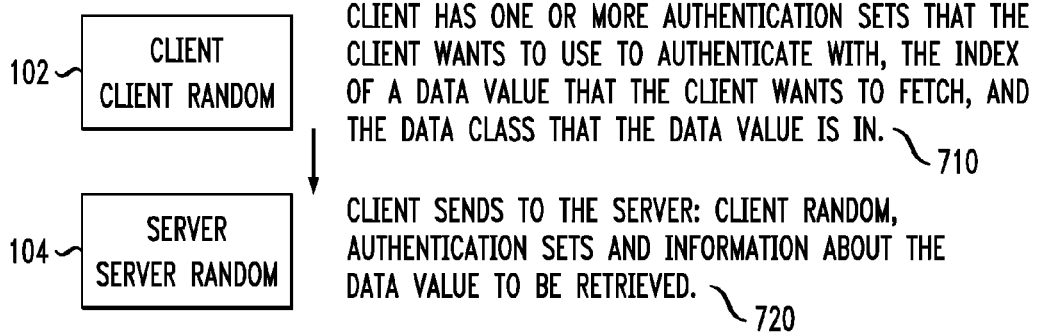

CLIENT HAS ONE OR MORE AUTHENTICATION SETS THAT THE CLIENT WANTS TO USE TO AUTHENTICATE WITH, THE INDEX OF A DATA VALUE THAT THE CLIENT WANTS TO FETCH, AND THE DATA CLASS THAT THE DATA VALUE IS IN. — 710

CLIENT SENDS TO THE SERVER: CLIENT RANDOM, AUTHENTICATION SETS AND INFORMATION ABOUT THE DATA VALUE TO BE RETRIEVED. — 720

SECURE STORAGE AND RETRIEVAL OF DATA IN A DATABASE WITH MULTIPLE DATA CLASSES AND MULTIPLE DATA IDENTIFIERS

CROSS-REFERENCE TO RELATED APPLICATIONS

The present application is related to U.S. patent application Ser. No. 13/931,188, filed Jun. 28, 2013, entitled "Cryptographically Linking Data and Authentication Identifiers Without Explicit Storage of Linkage," (now U.S. Pat. No. 9,288,049), incorporated by reference herein.

FIELD

The present invention relates generally to techniques for secure storage and retrieval of data in a database.

BACKGROUND

A user must often authenticate with a given authentication secret to gain access to a certain data secret. No other authentication secret should be able to be used to gain access to the associated data secret. In order to link data secrets with a corresponding authentication secret (e.g., defining which data secret is owned by (or associated with) which authentication secret), a look-up table is typically employed in which each data identifier (DataId) for a given data secret is matched up with the authentication identifier (AuthId) of the corresponding authentication secret that owns the data secret. The look-up table association, however, is explicitly stored in the server's database.

From a security perspective, explicitly storing the association between data secrets and corresponding authentication secrets means that an attacker who steals the database will obtain the association between data secrets and corresponding authentication secrets. If, for instance, the attacker knows that a certain authentication secret belongs to a user of interest, then the attacker may wish to concentrate their efforts on obtaining (and recovering) the data secrets associated with the authentication secret for the user of interest (the data secrets may be individually protected at the server).

U.S. patent application Ser. No. 13/931,188, filed Jun. 28, 2013, entitled "Cryptographically Linking Data and Authentication Identifiers Without Explicit Storage of Linkage," discloses methods and apparatus for cryptographically linking data identifiers and authentication identifiers without storing the association between the authentication and data secrets in the database of the server. While the disclosed techniques effectively cryptographically link authentication values and data values without having an explicit in-database look-up table, a need still remains for improved techniques for secure storage and retrieval of data in a database with multiple data classes and multiple data identifiers. A further need exists for additional techniques for mathematically determining the identifiers.

SUMMARY OF THE INVENTION

Generally, methods and apparatus are provided for secure storage and retrieval of data in a database with multiple data classes and multiple data identifiers. According to one aspect of the invention, one or more data values of a client are stored by a server by receiving from the client one or more authentication sets, at least one data value, an associated data class of the at least one data value and a pseudo-random client value; calculating a data seed value based on the pseudo-random client value, a pseudo-random server value and the associated data class of the at least one data value; generating a random data index value; generating a database index value based on the data seed value and the random data index value; storing the database index value; and providing the random data index value to the client.

According to another aspect of the invention, the client is authenticated at the time of storage based on the one or more authentication sets. The authentication sets comprise, for example, an authentication value that the client has previously provided to the server and an authentication index that the server has provided to the client in response to the client previously providing the authentication value. In one exemplary embodiment, the authentication of the client and the storage of the data are atomic steps such that only authenticated clients store the one or more data values.

According to another aspect of the invention, the client can retrieve data by providing one or more authentication sets, a random data index value of at least one data value that the client would like to obtain from storage, an associated data class of the at least one data value and a pseudo-random client value.

The disclosed techniques for secure storage and retrieval of data in a database of the illustrative embodiments overcome one or more of the problems associated with the conventional techniques described previously and provide improved security and functionality by providing multiple data classes and multiple data identifiers. These and other features and advantages of the present invention will become more readily apparent from the accompanying drawings and the following detailed description.

BRIEF DESCRIPTION OF THE DRAWINGS

FIGS. 6A, 6B and 6C, collectively, comprise a flow diagram showing an exemplary authentication and value storage process; and FIGS. 7A, 7B and 7C, collectively, comprise a flow diagram showing an exemplary authentication and value retrieval process.

DETAILED DESCRIPTION

Figure 1:
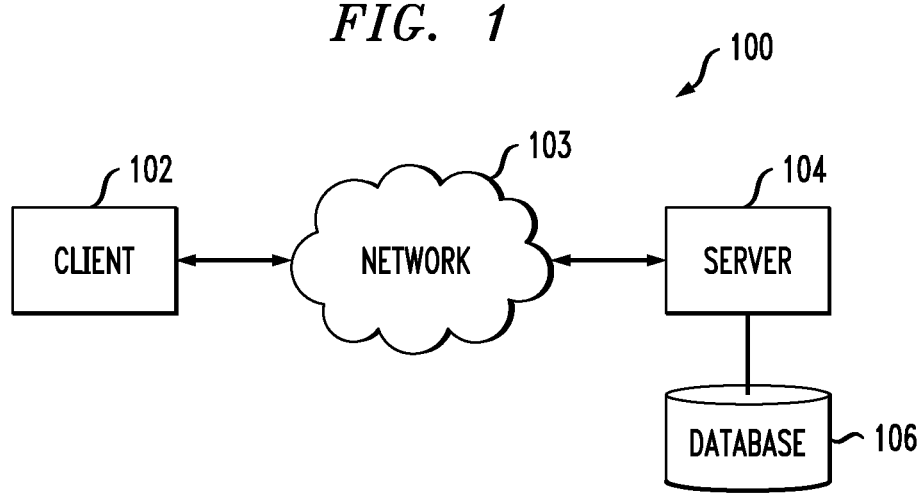
FIG. 1 is a simplified block diagram of an exemplary network environment in which the cryptographic techniques of the present invention may be implemented.

The present invention will be described herein with reference to an example network-based communication system in which one or more clients communicate over a network with one or more servers. It is to be appreciated, however, that the invention is not restricted to use in this or any other particular system configuration.

Aspects of the present invention provide improved techniques for secure storage and retrieval of data in a database with multiple data classes and multiple data identifiers. According to one aspect of the invention, multiple authentication identifiers are provided that can be linked together and used to authenticate a user. For example, multiple authentication identifiers can be used to link a current and one or more previous passwords to enable password history checking, and thereby ensure that the current password does not match any of the previous N passwords. In a further variation, multiple authentication identifiers can be used to allow password roll-over. In yet another variation, multiple authentication identifiers can be used to require that M of N (M<=N) passwords are submitted to authenticate a user.

In addition, multiple authentication identifiers can be used for N users each having one password. The system can optionally require that all N users need to provide their passwords together to a system and then M of N (M<=N) passwords are required to authenticate the group. The system can optionally allow each of the N users to access the data. Any one of these N users can authenticate, which requires multiple authentication identifiers able to be associated with a set of data identifiers.

As indicated above, U.S. patent application Ser. No. 13/931,188, filed Jun. 28, 2013, entitled "Cryptographically Linking Data and Authentication Identifiers Without Explicit Storage of Linkage," discloses methods and apparatus for cryptographically linking data identifiers and authentication identifiers. In one exemplary embodiment, an authentication identifier (AuthId) is cryptographically associated with its associated data identifiers (DataIds) using a random client value (Client Random) and a random server value (Server Random). The random client and server values are combined to produce a seed for a Key Derivation Function, which in turn is used to generate and validate the AuthId and DataIds.

According to one aspect of the present invention, multiple authentication identifiers are provided by associating the AuthIds with offsets of the Key Derivation Function other than offset 0. The DataIds are optionally stored in a separate database table, thus preventing a conflict of identifiers between the AuthIds and DataIds.

According to another aspect of the invention, multiple data classes (i.e., multiple classes of identifiers) are provided for the securely stored and retrieved data. Thus, the seed is a function of the random client and server values, as well as the data class identifier. For example, a storage system may optionally provide the following data classes:

primary authentication passwords;
secondary authentication values (e.g., life questions);
secret data (e.g., encryption keys);
personal information (e.g., bank account numbers);
finger print scans/geometry information; and
other data (e.g., known photos of individual).

Exemplary System

FIG. 1 shows a simplified network-based communication system 100 that will be used to illustrate the secure authentication and data storage techniques of the invention. The exemplary system 100 includes a client 102 and a server 104, both of which are configured to communicate over a network 103. As discussed hereinafter, the server 104 includes a database 106 to provide secure data storage and retrieval in accordance with aspects of the invention.

Although only a single client 102 is shown in FIG. 1, it is expected that a practical implementation of the system 100 will support a substantially larger number of clients. Similarly, although only a single server 104 is shown in FIG. 1, a system in accordance with the invention may include many such servers. The invention is therefore not restricted to the particular number of client or server devices.

The client 102 may represent a lightweight device, such as a mobile telephone, PDA, game console, etc. The client 102 may alternatively represent a desktop or laptop personal computer (PC), a microcomputer, a workstation, a mainframe computer, a wired telephone, a facsimile machine, a television set top box, or any other information processing device which can benefit from the secure authentication techniques of the invention. The client 102 may therefore also be implemented as a server. In other words, the invention, although particularly well-suited for use in applications in which roaming lightweight client devices authenticate themselves to servers, can be used for the secure authentication of any type of information processing device, including a device that is itself a server.

The client 102 may also be referred to herein as a user. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The server 104 may be implemented as an otherwise conventional server programmed to perform the secure storage and retrieval functions described herein or as other types of suitably-programmed information processing devices.

The network 103 may represent a global computer network such as the Internet, a wide area network (WAN), a local area network (LAN), a satellite network, a telephone or cable network, or various portions or combinations of these and other types of networks.

It is noted that the client 102 can optionally communicate with an Application Server (not shown), and the Application Server can optionally communicate with a Database Server (not shown), that could own the database 106. In such a variation, the information described herein as pertaining to the "Client" would be spread between the Client and the Application Server. Likewise, the information described herein as pertaining to the "Server" in this case would pertain to the Database Server. Typically, the Application Server would contain the Client Random and would be Data Class aware. The Client would use Application Programming Interfaces (APIs) in the Application Server and the Application Server would determine which Data Class to use. The Client would store the indices (n) and (p), and would know the authentication values and data values.

As is apparent from the foregoing, the system 100 as illustrated in FIG. 1 may be viewed more generally as a system having at least two processing devices that are configured to communicate with one another and in which a given one of the devices securely stores data of the other devices. The particular "client" and "server" labels provided for devices in FIG. 1 should thus be considered as examples only and not limitations of the invention.

Figure 2:
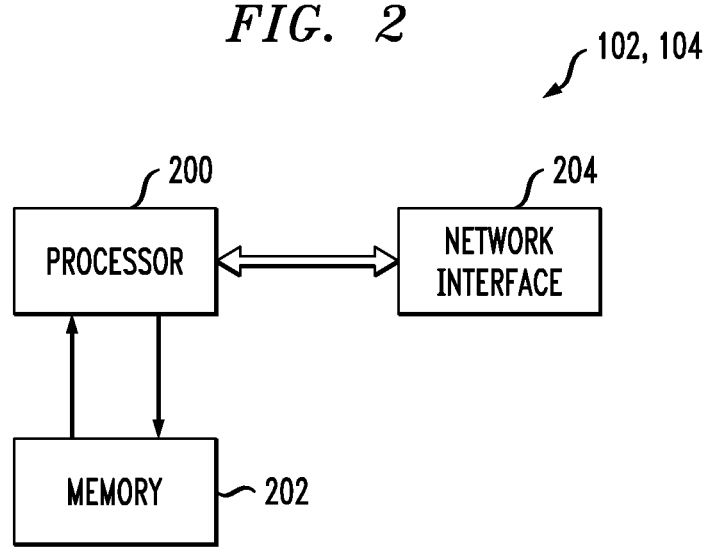
FIG. 2 illustrates one possible implementation of a given one of the client or server devices of the FIG. 1 system.

FIG. 2 shows one possible implementation of a given one of the processing devices 102 or 104 of the FIG. 1 system. The device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 202 and executed by the corresponding processor 200. The memory 202 is also used for storing information used to perform computations or other operations associated with the secure authentication protocols of the invention.

Figure 4:
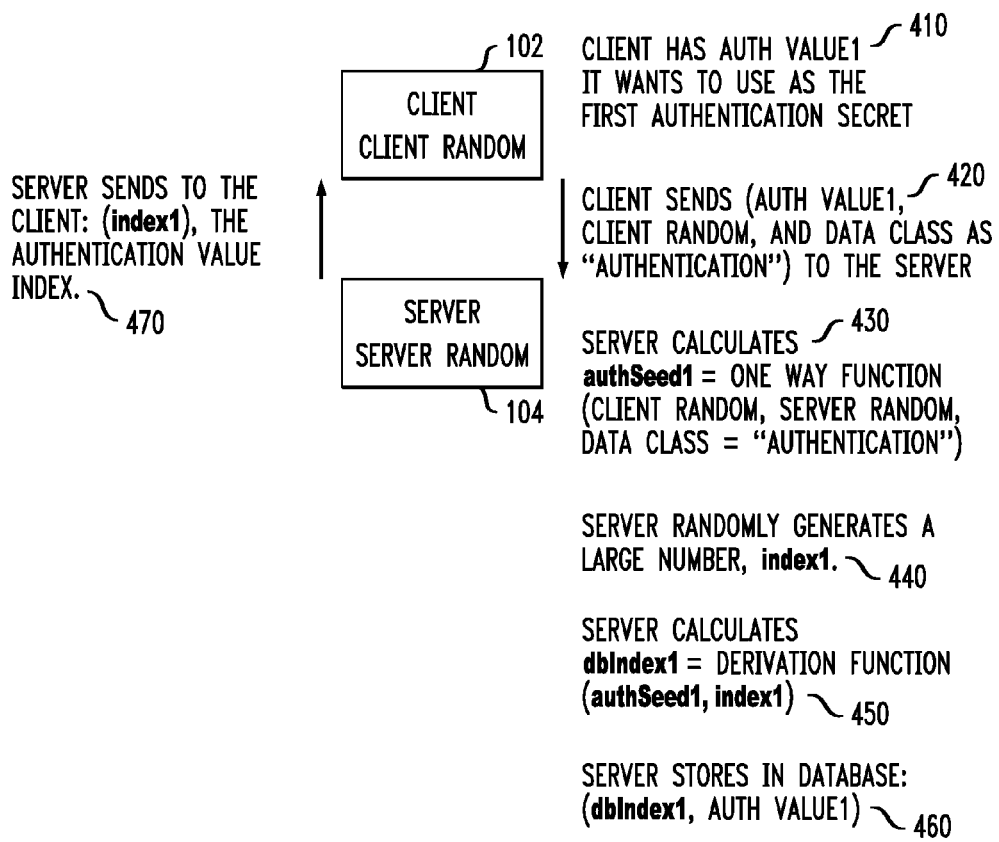
FIG. 4 is a flow diagram showing an exemplary registration process.
Figure 5A:
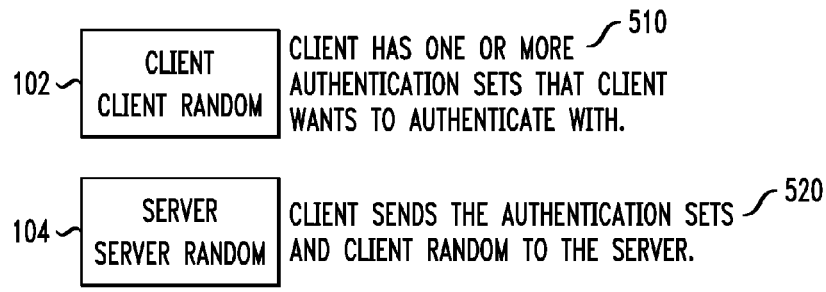
FIGS. 5A and 5B, collectively, comprise a flow diagram showing an exemplary authentication process.
Figure 5B:
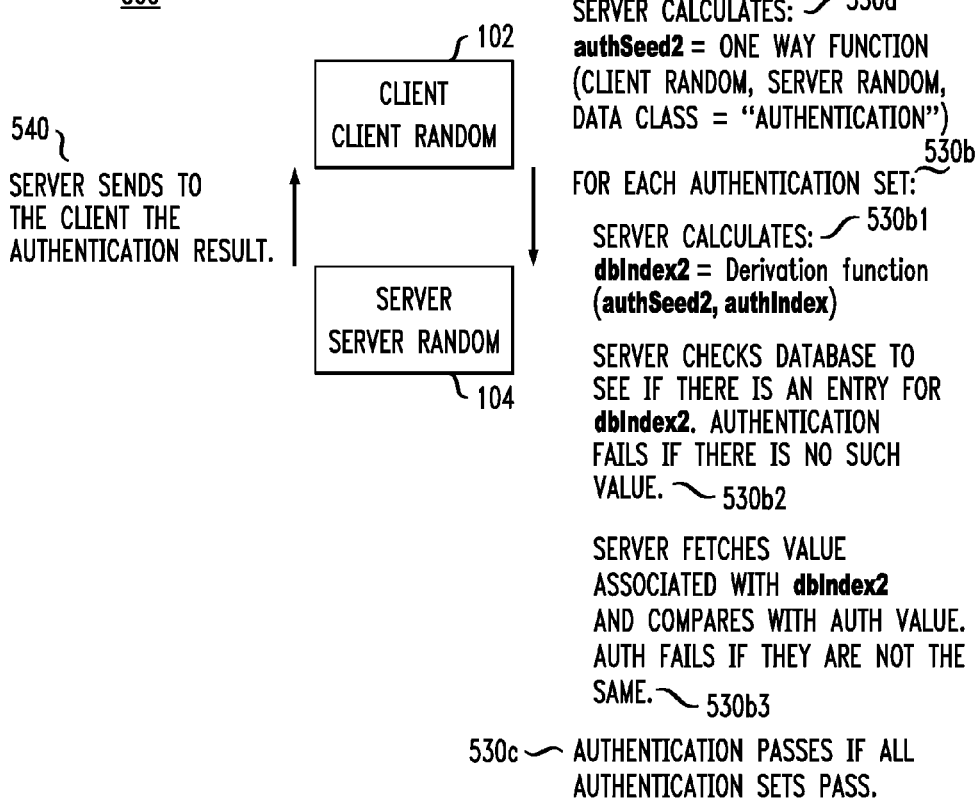
Figure 7B:
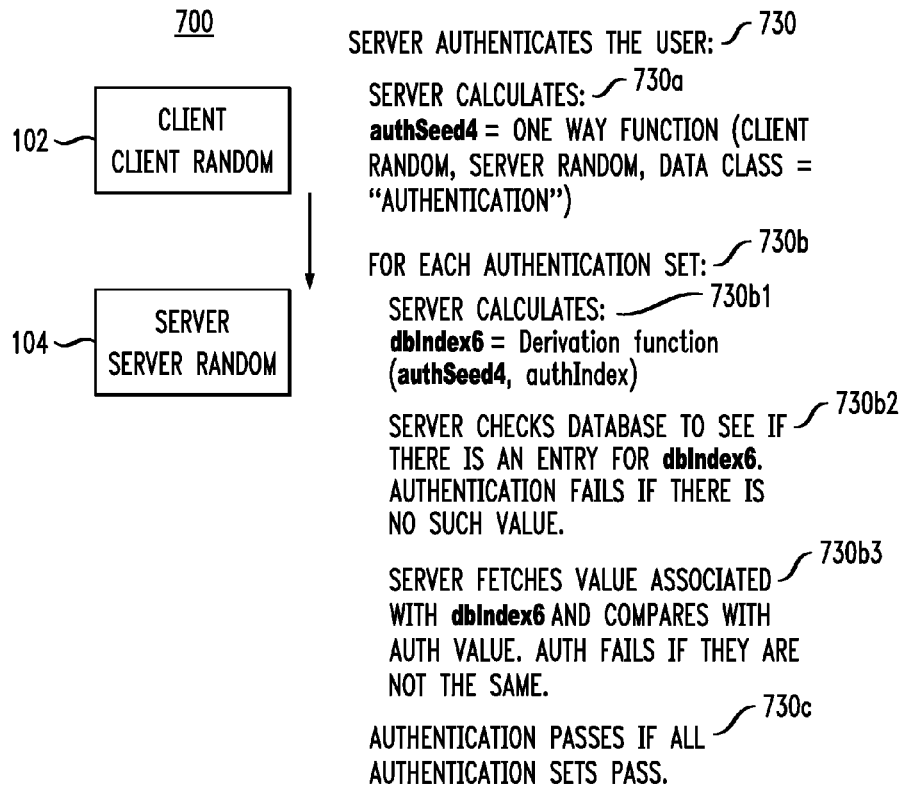
Figure 7C:
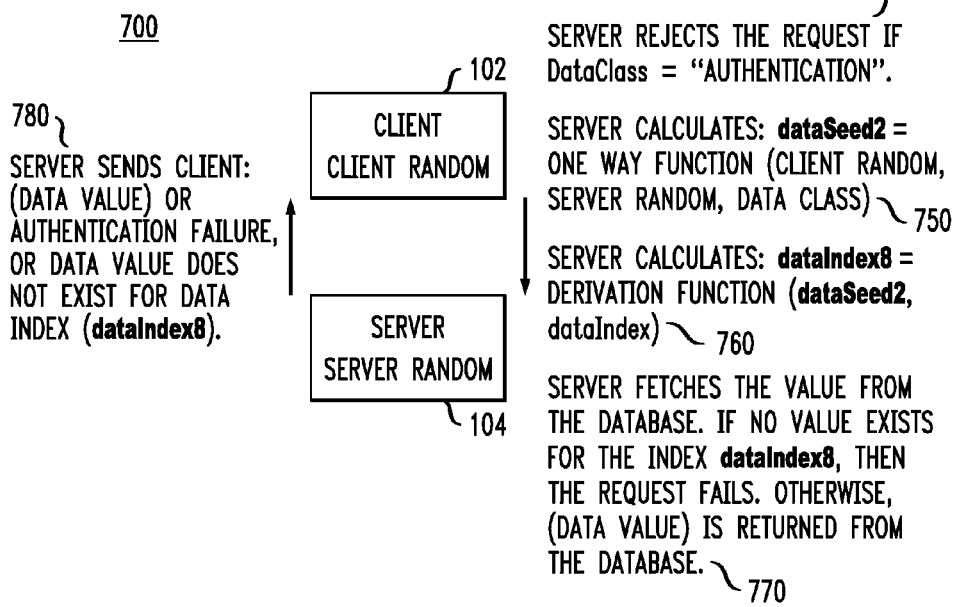

As indicated above, aspects of the present invention provide improved techniques for secure storage and retrieval of data in a database with multiple data classes and multiple data identifiers. As discussed hereinafter, FIG. 3 describes an exemplary initialization process that generates and stores the random client and server values. FIG. 4 describes an exemplary registration process that generates one or more authentication value indices (AuthIds). FIGS. 5A and 5B describe an exemplary authentication process. FIGS. 6A, 6B and 6C describe an exemplary authentication and value storage process. FIGS. 7A, 7B and 7C describe an exemplary authentication and value retrieval process. The storage and retrieval of a value associated with a data identifier requires one or more authentication value indices (AuthIds) to be presented along with the authentication indices, and the data identifier value.

Figure 3:
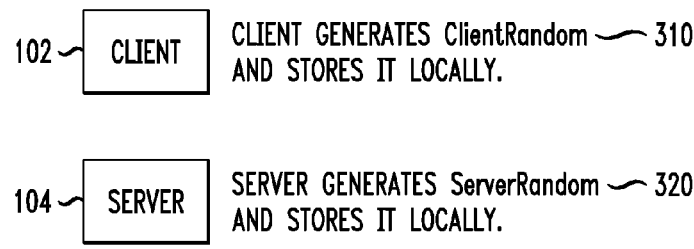
FIG. 3 is a flow diagram showing an exemplary initialization process.

FIG. 3 is a flow diagram showing an exemplary initialization process 300 that incorporates aspects of the present invention. Generally, the initialization process 300 generates and stores a Client Random value in the client 102 and generates and stores a Server Random value in the in the server 104. As shown in FIG. 3, the client 102 generates a random number, referred to as "ClientRandom," during step 310, and stores it locally. In addition, the server 104 generates a random number, referred to as "ServerRandom," during step 320, and stores it locally.

Prior to first usage of this system, an initial "first" authentication value must be stored. FIG. 4 is a flow diagram showing an exemplary registration process 400 that incorporates aspects of the present invention. Generally, the registration process 400 registers the first authentication value.

As shown in FIG. 4, the client 102 initially has an authentication value, Auth Value1, that the client 102 wants to use as the first authentication secret, during step 410. The client 102 sends (Auth Value1, Client Random, and Data Class as "authentication") to the server 104 during step 420.

The exemplary server 104 then calculates a seed value during step 430 as follows:
authSeed1=One Way Function(Client Random, Server Random, Data Class="authentication").

The exemplary server 104 randomly generates a large number, index1, during step 440. The server 104 calculates an index value during step 450, as follows:
dbIndex1=Derivation Function(authSeed1, index1).

During step 460, the server 104 stores the following values in the database 106:
(dbIndex1, Auth Value1),
and then sends the client 102 the generated large number (index1), comprising the authentication value index during step 470.

FIGS. 5A and 5B, collectively, comprise a flow diagram showing an exemplary authentication process 500 that incorporate aspects of the present invention. Generally, once one or more authentication values are created in the system, the authentication process 500 can be used in isolation to allow a client 102 to authenticate with the server 104. The authentication process 500 can be used to check a single authentication value, or multiple authentication values simultaneously. When multiple values are checked simultaneously, then all values must authenticate for the user requesting authentication to be deemed to be authenticated. The exemplary authentication process 500 of FIGS. 5A and 5B assumes that there can be one or more authentication values used to authenticate. The enforcement of the number of values needed for authentication is a server configuration value.

As shown in FIG. 5A, a client preparation portion of the exemplary authentication process 500 is initiated during step 510 when the client 102 has one or more authentication sets that the client 102 wants to authenticate with, where each authentication set has the following form:
(Auth Value, authIndex, Data Class="authentication")
For instance, there could be one set, with the following values:
Auth Value="password"
authIndex=index2
Data Class="authentication"
The client 102 then sends the authentication set(s) and Client Random to the server 104 during step 520.

As shown in FIG. 5B, an authentication portion of the exemplary authentication process 500 is initiated during step 530, where the server 104 authenticates the user (client) 102, as follows. During step 530a, the server 104 calculates an authentication seed, as follows:
authSeed2=One Way Function(Client Random, Server Random, Data Class="authentication").

For each authentication set, at step 530b, the server 104 performs the following steps. The server 104 calculates a database index during step 530b1:
dbIndex2=Derivation Function(authSeed2, authIndex)
The server 104 then checks the database 106 during step 530b2 to determine if there is an entry for dbIndex2. The authentication fails if dbIndex2 is not in the database 106.

If dbIndex2 is in the database 106, the server 104 fetches the value associated with dbIndex2 during step 530b3 and compares the obtained value with Auth Value. The authentication fails if the obtained value and Auth Value are not equal. The authentication passes during step 530c if all authentication sets pass. The server 104 sends the client 102 the authentication result during step 540.

FIGS. 6A, 6B and 6C, collectively, comprise a flow diagram showing an exemplary authentication and value storage process 600 that incorporate aspects of the present invention. Generally, a client 120 can store a value as part of the system. The stored value could be an authentication value, which could then later be used to authenticate with, or could be a data value of a certain data class. The data class that lets users authenticate is called an "authentication" data class. To store a value, the user must authenticate, and then store the value. In the exemplary embodiment, this operation is atomic, to ensure that only authenticated users can store values.

As shown in FIG. 6A, a client preparation portion of the exemplary authentication and value storage process 600 is initiated during step 610 when the client 102 has one of more authentication sets (Auth Value, authIndex) that the client 102 wants to use to authenticate with, and a data value belonging to a certain Data Class that the client 102 wishes to store, such as the following:
data value="dataValue1", and Data Class="DataValues".
The client 102 sends the server 104 the Client Random value, the authentication sets and the value to be stored, during step 620. As indicated above, the exemplary authentication sets are of the following form:

(Auth Value, authIndex, Data Class="authentication").

For example, if there was one authentication set, then the client 102 might send the following values to the server 104:

Authentication Set: (Auth Value="password"; authIndex=index3; Data Class="authentication"); and Data to Store: (Data Value="dataValue1", Data Class="DataValues").

As shown in FIG. 6B, an authentication portion of the exemplary authentication and value storage process 600 is initiated during step 630, where the server 104 authenticates the user (client) 102, as follows. During step 630*a*, the server 104 calculates an authentication seed, as follows:

authSeed3=One Way Function (Client Random, Server Random, Data Class="authentication")

For each authentication set, at step 630*b*, the server 104 performs the following steps. The server 104 calculates a database index during step 630*b*1, as follows:

dbIndex3=Derivation Function(authSeed3, authIndex)

The server 104 then checks the database 106 during step 630*b*2 to determine if there is an entry for dbIndex3. The authentication fails if dbIndex3 is not in the database 106.

If dbIndex3 is in the database 106, the server 104 fetches the value associated with dbIndex3 during step 630*b*3 and compares the obtained value with Auth Value. The authentication fails if the obtained value and Auth Value are not equal. The authentication passes during step 630*c* if all authentication sets pass.

As shown in FIG. 6C, a value storage portion of the exemplary authentication and value storage process 600 is initiated during step 640, where the server 104 calculates a data seed as follows:

dataSeed1=One Way Function(Client Random, Server Random, Data Class="DataValues")

The server 104 then generates a large random number index4 during step 650 and calculates a database index value during step 660, as follows:

dbIndex4=Derivation Function(dataSeed1, index4)

The server 104 stores the following values in the database 106 during step 670:

(dbIndex4, Data Value).

During step 680, the server 104 sends the Client 102 the data value index (index4), or an authentication failure.

FIGS. 7A, 7B and 7C, collectively, comprise a flow diagram showing an exemplary authentication and value retrieval process 700 that incorporate aspects of the present invention. Generally, a client 102 can obtain a value from the database 106 as part of the system. The value returned can only be a data value. That is, values that belong to authentication Data Classes should generally not be returned. The data class that lets users authenticate is called an "authentication" data class. To obtain a value, the user (client) 102 must authenticate, and then retrieve the value. In the exemplary embodiment, this operation is atomic, to ensure that only authenticated users retrieve stored values.

As shown in FIG. 7A, a client preparation portion of the exemplary authentication and value retrieval process 700 is initiated during step 710 when the client 102 has one of more authentication sets (Auth Value, authIndex) that the client 102 wants to use to authenticate with, the index of a data value that the client 102 wants to fetch, and the Data Class that the data value is in. For example, the index may be dataIndex and the Data Class may be "DataValues".

During step 720, the client 102 sends the server 104 the Client Random value, the authentication set(s) and information about the data value to be retrieved. The authentication sets may have the following exemplary form:

(Auth Value, authIndex, DataClass="authentication").

For example, if there was just one authentication set, then the client 102 might send the following:

Authentication Set: (Auth Value="password"; authIndex=index5; Data Class="authentication")

Data to Retrieve: (dataIndex=dataIndex7, Data Class="DataValues")

As shown in FIG. 7B, an authentication portion of the exemplary authentication and value retrieval process 700 is initiated during step 730, where the server 104 authenticates the user (client) 102, as follows. During step 730*a*, the server 104 calculates an authentication seed, as follows:

authSeed4=One Way Function (Client Random, Server Random, Data Class="authentication")

For each authentication set, at step 730*b*, the server 104 performs the following steps. The server 104 calculates a database index during step 730*b*1, as follows:

dbIndex6=Derivation Function(authSeed4, authIndex)

The server 104 then checks the database 106 during step 730*b*2 to determine if there is an entry for dbIndex6. The authentication fails if dbIndex6 is not in the database 106.

If dbIndex6 is in the database 106, the server 104 fetches the value associated with dbIndex6 during step 730*b*3 and compares the obtained value with Auth Value. The authentication fails if the obtained value and Auth Value are not equal. The authentication passes during step 730*c* if all authentication sets pass.

As shown in FIG. 7C, a value retrieval portion of the exemplary authentication and value retrieval process 700 is initiated during step 740, where the server 104 rejects the request if DataClass="authentication." In this manner, the server 104 cannot return authentication values.

The server 104 then calculates a data seed during step 750, as follows:

dataSeed2=One Way Function (Client Random, Server Random, Data Class)

The server 104 then calculates a database index value during step 760, as follows:

dbIndex8=Derivation Function (dataSeed2, dataIndex).

The server 104 fetches the requested value from the database 106 during step 770. If no value exists for the index dataIndex8, then the request fails. Otherwise, Data Value is returned from the database 106.

During step 780, the server 104 sends one or more of the following indicators to the client 102: (Data Value); Authentication Failure, or data value does not exist for data index (dataIndex8).

Alternative Derivation Functions

NIST SP 800-108 (http://csrc.nist.gov/publications/nist-pubs/800-108/sp800-108.pdf) specifies a variety of Key Derivation Functions (KDFs).

The KDF should be cryptographically strong so that it cannot be reversed (determining the association from one identifier to another).

Other alternatives comprise:

Identifier=Symmetric Cipher(Initialization Vector, Value). Initialization Vector is the Seed. Value is the index.

Identifier=MessageDigest(Seed, Value). Value is the index.

Identifier=Message Authentication Code (Key, Value). Key is the Seed. Value is the index.

Identifier=RSA Encrypt(Public Key, Value), where the value could be the message digested value of any of the Identifier values above.

Conclusion

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved techniques for cryptographically linking data secrets with a corresponding authentication secret. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with time-varying credentials, such as token codes, or authentication information, and other types of access-controlled resources. Also, the particular configuration of system elements shown in FIGS. 1 and 2, and their interactions as shown in FIGS. 3 through 6, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A server method for storing one or more data values of a client, the method comprising the steps of:
    receiving from said client one or more authentication sets, at least one data value, an associated data class of said at least one data value and a pseudo-random client value wherein said associated data class is one of a plurality of available data classes;
    calculating a data seed value based on said pseudo-random client value, a pseudo-random server value and said associated data class of said at least one data value;
    generating a random data index value;
    generating, using at least one processing device, a database index value based on said data seed value and said random data index value;
    storing said database index value; and
    providing said random data index value to said client.

2. The method of claim 1, further comprising the step of authenticating said client based on said one or more authentication sets.

3. The method of claim 2, wherein each of said one or more authentication sets comprises an authentication value that said client has previously provided to said server, an authentication index that said server has provided to said client in response to said client previously providing said authentication value and an indication that a data class of said corresponding authentication value is an authentication data class.

4. The method of claim 2, wherein said step of authenticating said client based on said one or more authentication sets further comprises the steps of:
    calculating an authentication seed based on said pseudo-random client value, a pseudo-random server value and an authentication data class;
    calculating a database index based on said authentication seed and an authentication index in a given one of said authentication sets; and
    determining if a stored value associated with said calculated database index matches said authentication value in said given one of said authentication sets.

5. The method of claim 4, wherein said authentication passes if all of said authentication sets pass said determining step.

6. The method of claim 4, further comprising the step of returning a failure message if said stored value associated with said calculated database index does not match said authentication value in said given one of said authentication sets.

7. The method of claim 2, wherein said authenticating and storing steps are atomic steps such that only authenticated clients store said one or more data values.

8. The method of claim 2, further comprising the step of receiving from said client one or more authentication sets, a random data index value of at least one data value that said client would like to obtain from storage, an associated data class of said at least one data value and a pseudo-random client value.

9. The method of claim 8, further comprising the step of authenticating said client based on said one or more received authentication sets, and wherein said step of authenticating said client based on said one or more authentication sets further comprises the steps of:
    calculating an authentication seed based on said pseudo-random client value, a pseudo-random server value and an authentication data class;
    calculating a database index based on said authentication seed and an authentication index in a given one of said received authentication sets; and
    determining if a stored value associated with said calculated database index matches said authentication value in said given one of said received authentication sets.

10. The method of claim 8, further comprising the step of rejecting a request for said at least one data value that said client would like to obtain from storage if a data class of at least one of said one or more authentication sets is an authentication data class.

11. The method of claim 8, further comprising the steps of:
    calculating a data seed value based on said pseudo-random client value, a pseudo-random server value and said associated data class of said at least one data value;
    generating a database index value based on said data seed value and said received random data index value of said at least one data value that said client would like to obtain from storage;
    obtaining a value associated with said generated database index value from storage; and
    providing said obtained value to said client.

12. A computer program product for storing one or more data values of a client, said computer program product comprising a non-transitory machine-readable recordable storage medium having encoded therein executable code of one or more software programs, wherein the one or more software programs when executed by a processor of a processing device implement the following steps:

receiving from said client one or more authentication sets, at least one data value, an associated data class of said at least one data value and a pseudo-random client value, wherein said associated data class is one of a plurality of available data classes;

calculating a data seed value based on said pseudo-random client value, a pseudo-random server value and said associated data class of said at least one data value;

generating a random data index value;

generating a database index value based on said data seed value and said random data index value;

storing said database index value; and providing said random data index value to said client.

13. A server apparatus for storing one or more data values of a client, the apparatus comprising:

a memory; and at least one hardware device, coupled to the memory, operative to:

receive from said client one or more authentication sets, at least one data value and an associated data class of said at least one data value and a pseudo-random client value, wherein said associated data class is one of a plurality of available data classes;

calculate a data seed value based on said pseudo-random client value, a pseudo-random server value and said associated data class of said at least one data value;

generate a random data index value;

generate a database index value based on said data seed value and said random data index value;

store said database index value; and provide said random data index value to said client.

14. The server apparatus of claim 13, wherein said at least one hardware device is further configured to authenticate said client based on said one or more authentication sets.

15. The server apparatus of claim 14, wherein each of said one or more authentication sets comprises an authentication value that said client has previously provided to said server and an authentication index that said server has provided to said client in response to said client previously providing said authentication value.

16. The server apparatus of claim 14, wherein said authentication of said client based on said one or more authentication sets further comprises:

calculating an authentication seed based on said pseudo-random client value, a pseudo-random server value and an authentication data class;

calculating a database index based on said authentication seed and an authentication index in a given one of said authentication sets; and determining if a stored value associated with said calculated database index matches said authentication value in said given one of said authentication sets.

17. The server apparatus of claim 16, wherein said authentication passes if all of said authentication sets pass said determining step.

18. The server apparatus of claim 16, wherein said at least one hardware device is further configured to return a failure message if said stored value associated with said calculated database index does not match said authentication value in said given one of said authentication sets.

19. The server apparatus of claim 14, wherein said authentication of the client and the storage of data values are atomic such that only authenticated clients store said one or more data values.

20. The server apparatus of claim 14, wherein said at least one hardware device is further configured to receive from said client one or more authentication sets, a random data index value of at least one data value that said client would like to obtain from storage, an associated data class of said at least one data value and a pseudo-random client value.

21. The server apparatus of claim 20, wherein said at least one hardware device is further configured to authenticate said client based on said one or more received authentication sets, and wherein authentication of said client based on said one or more authentication sets further comprises:

calculating an authentication seed based on said pseudo-random client value, a pseudo-random server value and an authentication data class;

calculating a database index based on said authentication seed and an authentication index in a given one of said received authentication sets; and determining if a stored value associated with said calculated database index matches said authentication value in said given one of said received authentication sets.

22. The server apparatus of claim 20, wherein said at least one hardware device is further configured to reject a request for said at least one data value that said client would like to obtain from storage if a data class of at least one of said one or more authentication sets is an authentication data class.

23. The server apparatus of claim 20, wherein said at least one hardware device is further configured to:

calculate a data seed value based on said pseudo-random client value, a pseudo-random server value and said associated data class of said at least one data value;

generate a database index value based on said data seed value and said received random data index value of said at least one data value that said client would like to obtain from storage;

obtain a value associated with said generated database index value from storage; and provide said obtained value to said client.

\* \* \* \* \*

UNITED STATES PATENT AND TRADEMARK OFFICE
CERTIFICATE OF CORRECTION

PATENT NO. : 9,455,973 B1
APPLICATION NO. : 14/139978
DATED : September 27, 2016
INVENTOR(S) : Peter Robinson et al.

It is certified that error appears in the above-identified patent and that said Letters Patent is hereby corrected as shown below:

In the Specification

Column 1, Line 46, please insert the following after "Storage of Linkage,"" --(now U.S. Patent No. 9,288,049),--.

Column 3, Line 22, please insert the following after "Storage of Linkage,"" --(now U.S. Patent No. 9,288,049),--.

Column 5, Lines 31-32, replace "Server Random value in the in the server 104." with --Server Random value in the server 104.--.

Column 6, Line 60, replace "client 102 has one of more" with --client 102 has one or more--.

Column 7, Line 60, replace "client 102 has one of more" with --client 102 has one or more--.

Signed and Sealed this
Fourteenth Day of February, 2017

Michelle K. Lee
*Director of the United States Patent and Trademark Office*